(12) United States Patent
Krammer et al.

(10) Patent No.: US 9,579,713 B2
(45) Date of Patent: Feb. 28, 2017

(54) METHOD FOR PRODUCING A VEHICLE BODY OR A VEHICLE BODY MODULE

(71) Applicant: MAGNA STEYR Fahrzeugtechnik AG & Co KG, Graz (AT)

(72) Inventors: Christoph Krammer, Deutschlandsberg (AT); Herbert Müller, Graz (AT)

(73) Assignee: MAGNA STEYR Fahrzeugtecknik AG & Co KG, Graz (AT)

( * ) Notice: Subject to any disclaimer, the term of this patent is extended or adjusted under 35 U.S.C. 154(b) by 312 days.

(21) Appl. No.: 14/578,361

(22) Filed: Dec. 20, 2014

(65) Prior Publication Data
US 2015/0174642 A1 Jun. 25, 2015

(30) Foreign Application Priority Data
Dec. 20, 2013 (EP) ................................ 13198868

(51) Int. Cl.
| | | |
|---|---|---|
| *B62D 29/00* | (2006.01) | |
| *B21K 7/12* | (2006.01) | |
| *B29C 70/88* | (2006.01) | |
| *B29C 35/02* | (2006.01) | |
| *B62D 65/02* | (2006.01) | |
| *B32B 5/02* | (2006.01) | |
| *B32B 5/12* | (2006.01) | |

(Continued)

(52) U.S. Cl.
CPC ............ *B21K 7/12* (2013.01); *B29C 35/0222* (2013.01); *B29C 70/885* (2013.01); *B32B 5/024* (2013.01); *B32B 5/12* (2013.01); *B32B 5/26* (2013.01); *B32B 15/14* (2013.01); *B62D 29/005* (2013.01); *B62D 65/02* (2013.01); *B32B 2250/40* (2013.01); *B32B 2260/023* (2013.01); *B32B 2260/046* (2013.01); *B32B 2605/00* (2013.01); *B32B 2605/08* (2013.01); *Y10T 29/49622* (2015.01)

(58) Field of Classification Search
CPC ... B23P 2700/12; B32K 7/12; B32B 2605/00; B32B 2605/08; B62D 29/005; B62D 65/02
See application file for complete search history.

(56) References Cited

U.S. PATENT DOCUMENTS

2006/0134395 A1   6/2006   Sigler et al.
2010/0098910 A1*  4/2010   Naritomi .................. B32B 7/12
                                                                428/141

FOREIGN PATENT DOCUMENTS

CN   102186666 A   9/2011
CN   102806621 A   12/2012
(Continued)

*Primary Examiner* — Christopher Besler
(74) *Attorney, Agent, or Firm* — Jordan IP Law, LLC; Todd A. Vaughn

(57) ABSTRACT

A method for producing a vehicle body or a vehicle body module, the method inclusing producing at least one sandwich component having a first metal sheet layer, a semifinished product layer formed by a non-cured semifinished product pre-impregnated with a matrix, and a second metal sheet layer, forming the vehicle body by joining the sandwich component into a vehicle body part, the matrix of the semifinished product layer of the sandwich component being uncured, and dip coating and drying the vehicle body, the matrix of the semifinished product layer of the sandwich component being cured during the dip coating and drying of the vehicle body.

18 Claims, 7 Drawing Sheets

(51) Int. Cl.
*B32B 5/26* (2006.01)
*B32B 15/14* (2006.01)

(56) References Cited

FOREIGN PATENT DOCUMENTS

| | | |
|---|---|---|
| CN | 103619578 A | 3/2014 |
| DE | 1557342 B1 | 2/1972 |
| DE | 102011015071 A1 | 9/2012 |
| DE | 102011113319 A1 | 3/2013 |
| EP | 2529920 A2 | 12/2012 |
| GB | 1181688 A | 2/1970 |
| WO | 2011100734 A1 | 8/2011 |

* cited by examiner

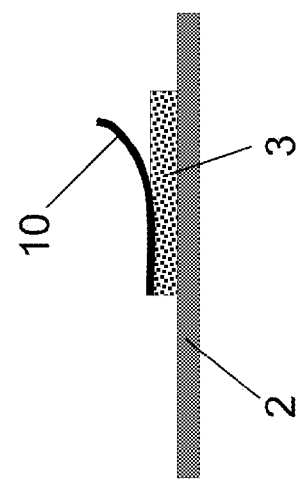
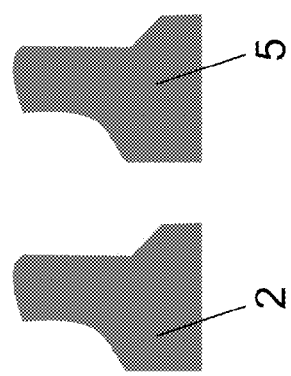
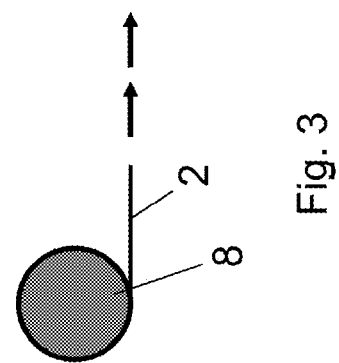
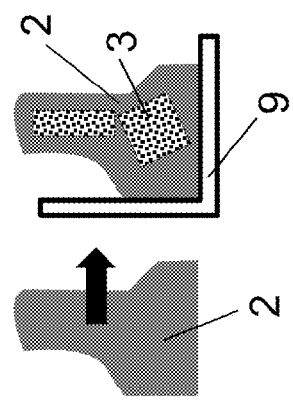
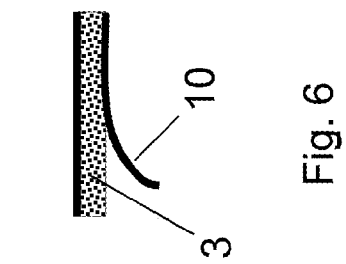
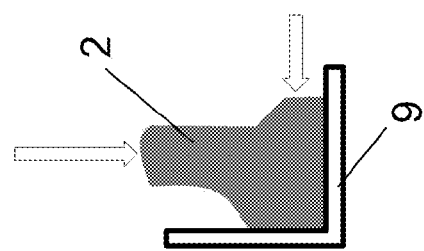

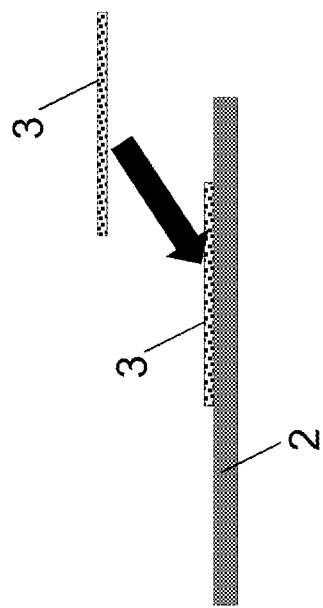
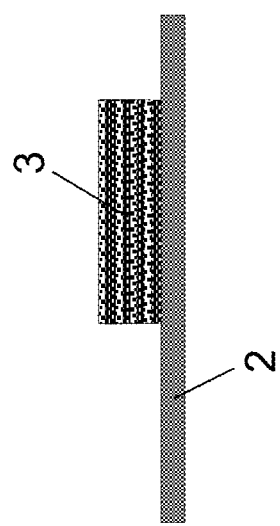
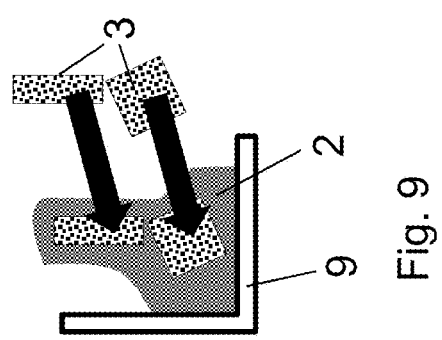
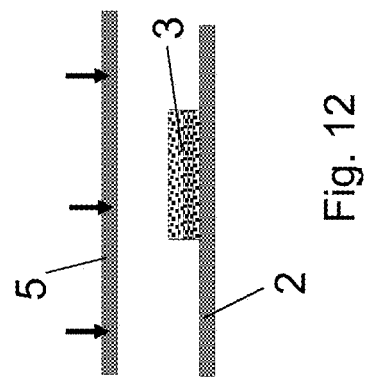
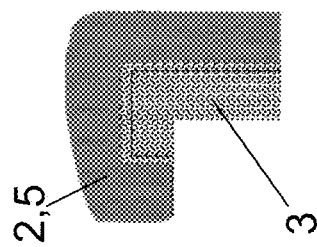

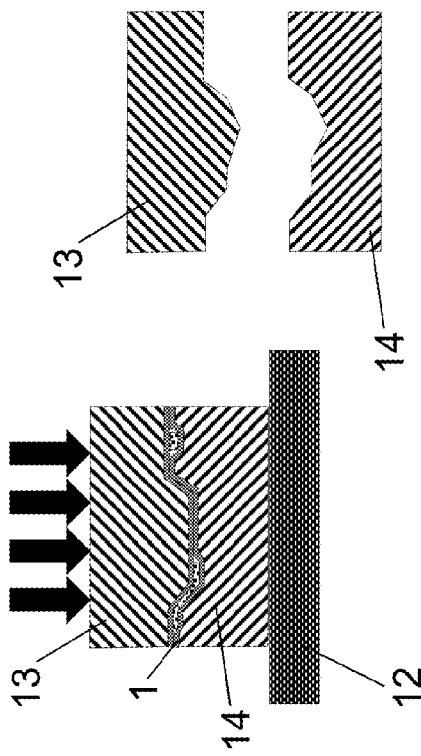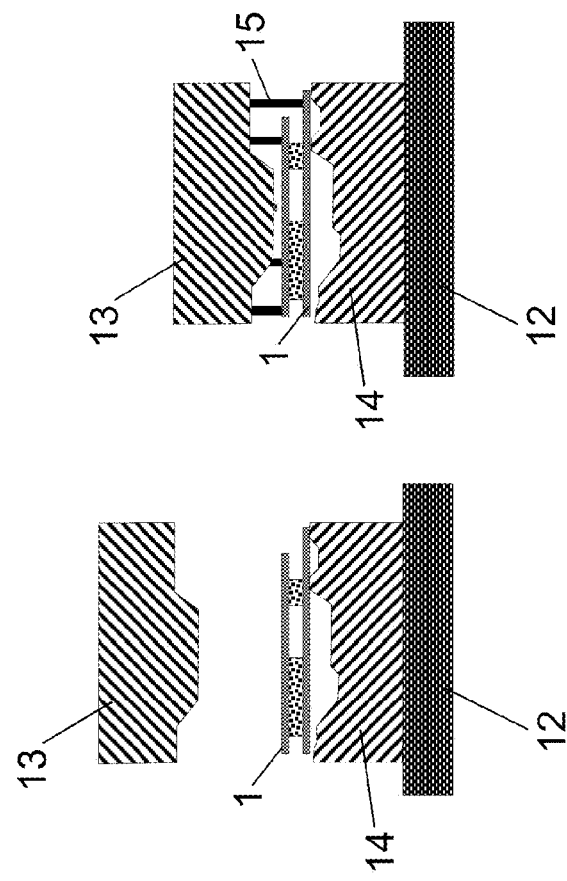

METHOD FOR PRODUCING A VEHICLE BODY OR A VEHICLE BODY MODULE

CROSS-REFERENCE TO RELATED APPLICATIONS

The present application claims priority 35 U.S.C. §119 to European Patent Publication No. EP 13198868.5 (filed on Dec. 20, 2013), which is hereby incorporated by reference in its entirety.

TECHNICAL FIELD

Embodiments relate to a method for producing a vehicle body or a vehicle body module, such vehicle body module to be in particular a subassembly of a vehicle.

BACKGROUND

For the production of vehicle bodies or vehicle body modules, it is known to use sandwich components. The sandwich components may use pre-impregnated semifinished products, in particular what are termed "prepregs", the matrix of the semifinished products being cured in a furnace, in particular in an autoclave, before the sandwich components are used further. The cured sandwich components are then joined to further vehicle body parts by known joining methods, such as spot welding, clinching, etc. The finished vehicle body or the vehicle body module is then coated, for example, by way of cathodic dip coating.

European Patent Publication No. EP 2529920 A2 discloses a method for producing a hybrid component for a motor vehicle, in which a metallic base profile is provided with a reinforcing element made of fibre composite material, these being pressed together in a pressing tool. In this process, the pressing tool is heated in order to achieve curing of the fibre composite material.

German Patent Publication No. DE 10 2011 113 319 A1 describes a method for producing a vehicle body component having a metallic main body and an areally connected reinforcement made of fibre-reinforced plastic (FRP), the reinforcement being sprayed onto the main body. After the FRP has been applied, the curing of the resin takes place.

SUMMARY

In accordance with embodiments, a method for producing a vehicle body or a vehicle body module is provided which may be carried out easily and cost-effectively.

In accordance with embodiments, a method for producing a vehicle body or a vehicle body module, may include at least one of: producing at least one sandwich component, comprising a first metal sheet layer, a semifinished product layer formed by a non-cured semifinished product pre-impregnated with a matrix, and a second metal sheet layer; joining the sandwich component into a vehicle body part to form a vehicle body or a vehicle body module, the matrix of the semifinished product layer of the sandwich component not being cured; and dip coating and drying the vehicle body or the vehicle body module, the matrix of the semifinished product layer of the sandwich component being cured.

In accordance with embodiments, a vehicle body module, such as a subassembly of a vehicle, or equally substantially an entire vehicle body of a vehicle is produced with at least one sandwich component, the fibre composite matrix of which has not yet been cured. The time-consuming and costly curing of the sandwich component or of the individual sandwich components is therefore dispensed with. Embodiments are based here on the concept that it is possible to handle the sandwich component comprising a middle pre-impregnated, non-cured semifinished product layer and outer metal sheet layers even if the semifinished product has not yet been cured, and therefore, the dip coating and drying method carried out for the vehicle body module may be utilized for the curing. This is promoted in particular by the viscosity of the matrix used.

Developments of embodiments are specified in the dependent claims, the description and also the accompanying drawings.

In accordance with embodiments, the vehicle body module is a subassembly. By way of example, the subassembly of a vehicle or else equally an entire vehicle body of a vehicle is therefore produced and coated.

In accordance with embodiments, the sandwich component is produced preferably by pressing the semifinished product layer onto the first metal sheet layer and by pressing the second metal sheet layer onto the semifinished product layer. It is also possible for a plurality of semifinished product layers to be stacked one on top of another and to be arranged between the metal sheets.

In accordance with embodiments, the matrix of the semifinished product layer may be exclusively used as an adhesive for producing the sandwich component. It is then possible to dispense with the use of an additional adhesive for joining the layers of the sandwich component.

In accordance with embodiments, before the sandwich component is produced, the metal sheet for the first and the second metal sheet layers is cut to size, cleaned and dried. The surface treatment of the metal sheet layers is important in particular for securely joining the layers by way of the matrix of the semifinished product.

In accordance with embodiments, at least one of the metal sheet layers of the sandwich component may comprise a plurality of separate metal sheets. It is also the case that the semifinished product layer of the sandwich component may comprise a plurality of separate semifinished products, which may be arranged on a common metal sheet layer.

In accordance with embodiments, after the sandwich component has been produced and before the sandwich component is joined into a vehicle body part, the sandwich component is formed, in particular at temperatures of below 70° C., particularly preferably without heating or at approximately 60° C., such that the matrix has not yet been cured. The forming may be effected in particular by deep drawing.

In accordance with embodiments, the first and second metal sheet layers of the sandwich component are joined to one another at least in marginal regions of the sandwich component, if appropriate also in core regions. This may be effected in particular by way of spot welding, friction stir welding, riveting, clinching and/or adhesive bonding.

In accordance with embodiments, the sandwich component is joined into a vehicle body part to form a vehicle body or a vehicle body module by welding, riveting, clinching, screwing and/or adhesive bonding.

In accordance with embodiments, the dip coating and drying of the vehicle body module or of the vehicle body comprises a drying phase at temperatures of above 100° C., preferably above 120° C., for at least 10 minutes, the matrix of the semifinished product layers of the sandwich components being cured substantially in the drying phase. Here, "substantially" way that the curing is effected to an extent of at least 80%, better to an extent of at least 90%, during this drying phase.

In accordance with embodiments, the drying phase takes place at temperatures of 155° C. to 185° C. for at least 15 minutes. The drying phase may be followed by topcoat application at temperatures of at least 140° C., such that the matrix of the semifinished product layers of the sandwich components is cured further. It is preferable, however, that complete curing is effected, i.e. to an extent of approximately 100%, already in the drying phase.

In accordance with embodiments, a method for producing a vehicle body may include at least one of: producing at least one sandwich component having a first metal sheet layer, a semifinished product layer formed by a non-cured semifinished product pre-impregnated with a matrix, and a second metal sheet layer; forming the vehicle body by joining the sandwich component into a vehicle body part, the matrix of the semifinished product layer of the sandwich component being uncured; and dip coating and drying the vehicle body, the matrix of the semifinished product layer of the sandwich component being cured during the dip coating and drying of the vehicle body.

In accordance with embodiments, a method for producing a vehicle body module may include at least one of: producing at least one sandwich component having a first metal sheet layer, a semifinished product layer formed by a non-cured semifinished product pre-impregnated with a matrix, and a second metal sheet layer; joining the sandwich component into a vehicle body part to thereby form the vehicle body in which the matrix of the semifinished product layer of the sandwich component is uncured; and dip coating and drying the vehicle body, the matrix of the semifinished product layer of the sandwich component being cured during the dip coating and drying of the vehicle body.

DRAWINGS

Embodiments will be illustrated by way of example in the drawings and explained in the description below.

FIGS. 3 through 26 illustrate the method in accordance with embodiments.

DESCRIPTION

Figure 1:
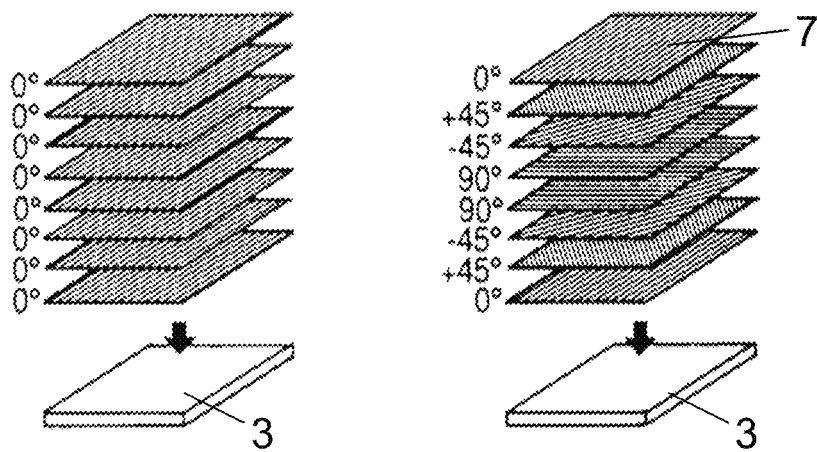
FIG. 1 illustrates an exploded view of a structure of semifinished products which are suitable for use in a method in accordance with embodiments.

FIG. 1 illustrates semifinished products 3, what are termed "prepregs," which are suitable for use in a method in accordance with embodiments. The individual prepregs 3 comprises a plurality of CFRP fabric layers 7, which are bonded to form a unidirectional anisotropic laminate (on the left in FIG. 1) or to form a multidirectional quasi-isotropic laminate (on the right). The fabric layers 7 are impregnated with a matrix, in particular with epoxy resin.

Embodiments are not restricted to CFRP fabric layers. It is also possible to use other materials, such as GFRP, aramid fibres, basalt fibres, cellulose fibres, etc. Furthermore, it is also possible for various materials to be mixed, and in addition the fibre orientation or the thickness of the layers may vary.

The prepregs which are used have a tacky state and retain this up to a later process step for the coating. The viscosity of the resin permits further processing.

Figure 2:
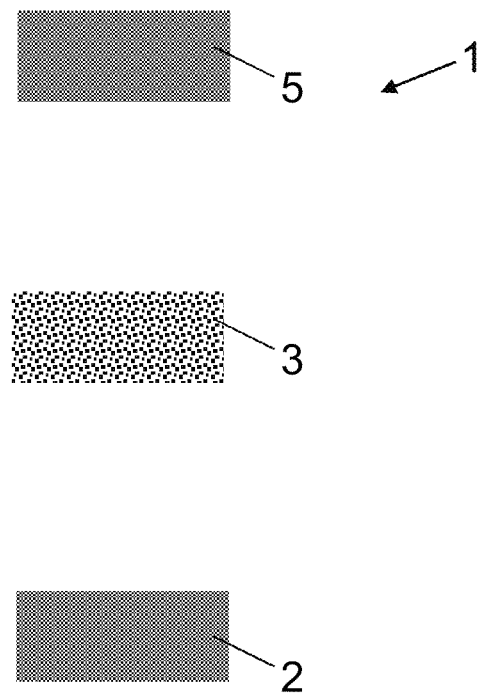
FIG. 2 illustrates the layers of a sandwich for use in a method in accordance with embodiments.

As illustrated in FIG. 2, a stack made up of a first metal sheet 2, a pre-impregnated semifinished product 3 and a second metal sheet 5 forms a sandwich component 1, which may be utilized in a method in accordance with embodiments.

As illustrated in FIG. 3, metal sheets 2 and prepregs 3, preferably each in the form of coils 8, are the starting substances for producing the sandwich component and subsequently the vehicle body. The prepregs may also be present already in plate form or as plate blanks as the starting substance.

As illustrated in FIG. 4, the metal sheets 2, 5 are unrolled from the coil 8 and cut by way of a plate blank cutting press or laser. The metal sheets may be used from the same coil 8 or from a plurality of coils 8. The metal sheets may optionally be cut differently.

The preparation of the semifinished product 3 will be described in more detail hereinbelow.

The prepreg semifinished product 3 may comprise one or a plurality of fabric layers 7, as illustrated in FIG. 1, with one fabric layer 7 corresponding to a fabric with resin impregnation. The prepregs 3 are likewise unrolled from coils 8, it being possible for these coils, depending on the structure of the later semifinished product layer 3, to each comprises different materials, and in this case too the fibre orientation or the thickness of the layers may vary. If these prepregs are provided with protective films 10, these are removed as the prepregs are being unrolled in the intermediate layers. If there are a plurality of fabric layers 7, these are joined to one another by rolling and then cut. Then, the joined fabric layers 7 are cut by way of a plate blank cutting press or by way of ultrasonic cutting.

Optionally, it is also possible for individual fabric layers 7 alone to be cut. Individually cut fabric layers 7 have to be stacked to the desired number by hand or using a robot. The individual fabric layers 7 may have the same fibre orientation (unidirectional, anisotropic) or different fibre directions (multidirectional, quasi-isotropic). The previously cut metal sheets 2, 5 have to be cleaned and degreased by hand or by way of a spraying system since they are usually supplied covered in oil. Then, the metal sheets are dried. A flawless surface is important for the subsequent joining process so that the resin adheres.

The production of the sandwich component 1 will be described on the basis of FIGS. 5 to 13.

As illustrated in FIG. 5, the first metal sheet 2 is placed into a positioning apparatus, the receiving and clamping apparatus 9, where it is held by way of clamps in a defined position.

As illustrated in FIGS. 6 and 7, the bottom protective films 10 are removed from the previously produced semifinished product layers 3 (prepregs), and these semifinished product layers are joined to the first metal sheet 2 by the application of pressure (taping).

As illustrated in FIG. 8, this is followed by the removal of all top protective films 10 of the prepregs and the application of the second metal sheet 5. Optionally, the second metal sheet 5 may be pressed on with a defined force.

As illustrated in FIGS. 9 to 12, it is also possible for a plurality of semifinished product layers 3 to be placed onto the first metal sheet 2 in order to form a stack of semifinished products 3.

Optionally, it is possible to use a plurality of semifinished products 3 of differing type (resin, fibre type, direction, etc.) and dimension (length, width, height). The metal sheet layers 2, 5 bond to the semifinished product layer 3 by way of the matrix of the semifinished product 3. Optionally, an additional adhesive may also be used.

As illustrated in FIG. 13, it is beneficial to the metal sheets 2, 5 to provide a marginal region in which there are arranged no prepregs 3. These marginal regions may be utilized later for joining the sandwich 1 and make it possible to observe a distance of at least 30 mm between the joints 22 and the semifinished product 3.

A preliminary pressing and forming process may subsequently be effected. The sandwich 1 is removed from the apparatus for forming the sandwich stack and inserted into a press 11.

Figure 15:
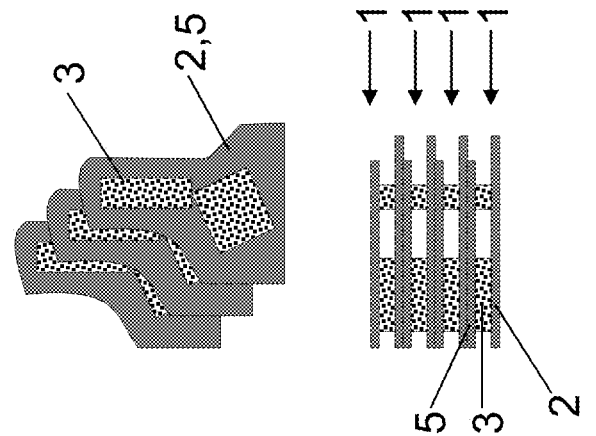
Figure 14:
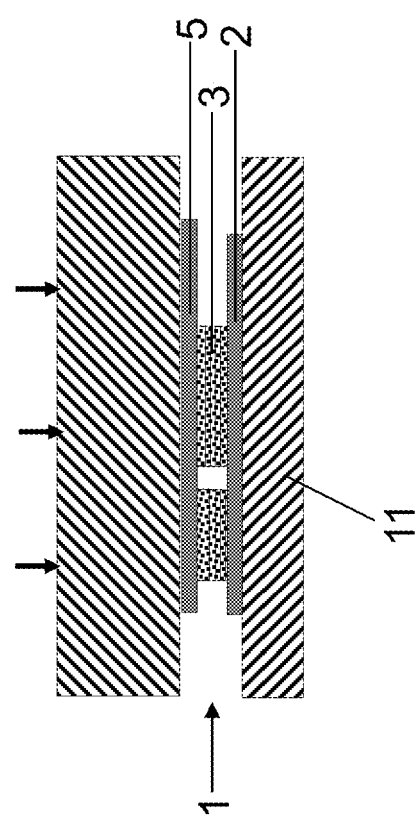
Figure 23:
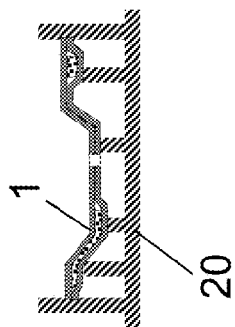
Figure 21:
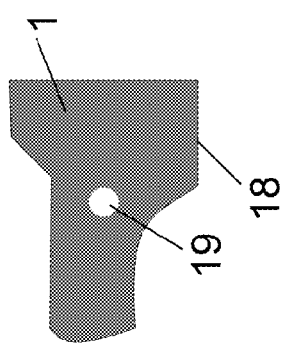
Figure 22:
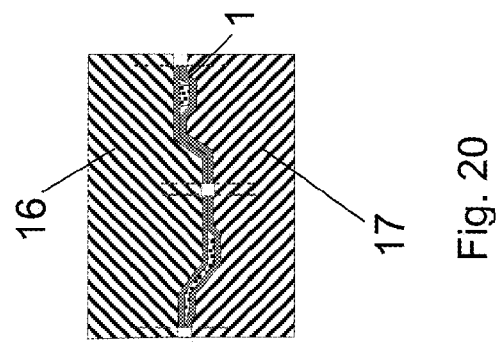
Figure 20:
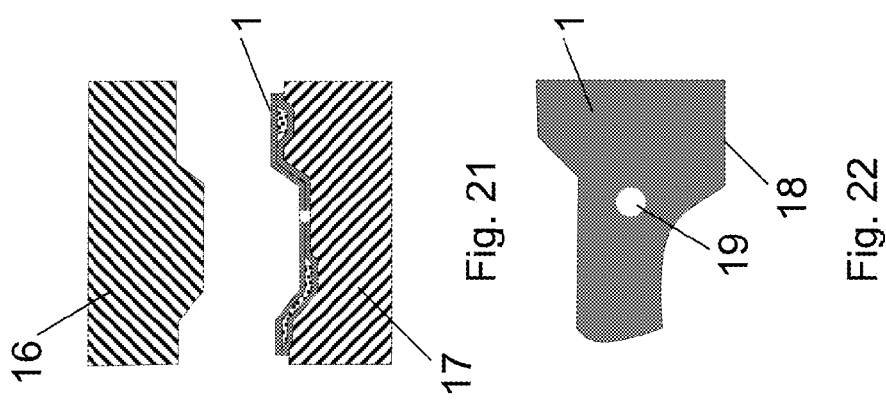
Figure 25:
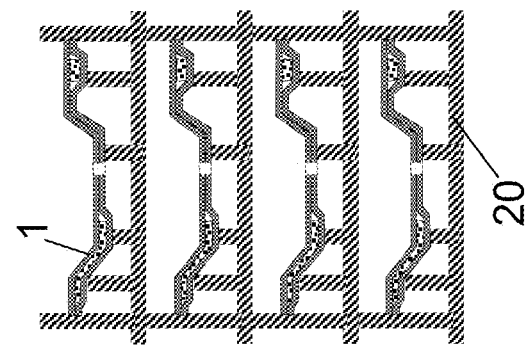

As illustrated in FIG. 15, optionally, the sandwich semifinished product may be covered in oil or lubricated on the outside and preheated, to approximately 60° C. After it has been held down in the press 11 and possibly intermediately stored, the sandwich semifinished product 1 is deep drawn. Here, the epoxy resin which forms the matrix of the semifinished product 3 may still be processed, since it has not been cured.

As illustrated in FIGS. 16 to 18, the deep drawing process may be carried out conventionally. The sandwich component 1 is formed without the supply of heat or using preheated plate blanks, but not by hot forming in the narrower sense. As illustrated in FIG. 16, the sandwich 1 is placed onto a drawing punch 14 on a bottom press part 12. The sandwich 1 may be held down by way of holding-down devices 15 and may be formed by the die 13.

Further steps such as further forming, perforating or the pressing in of sleeves or bushings are optionally effected. For the pressing in of bushings, the sandwich component 1 has to be held down by way of holding-down devices 15.

As illustrated in FIG. 19, this is followed by removal from the press and insertion into an apparatus for cutting and perforating by way of a laser or punch cutting, illustrated by a cutting tool bottom part 17 and a cutting tool top part 16. The sandwich 1 is removed from the cutting tool 16, 17. The non-cured component 1 is transported to a joining station in a transport frame 20 with mould receptacles.

Figure 24:
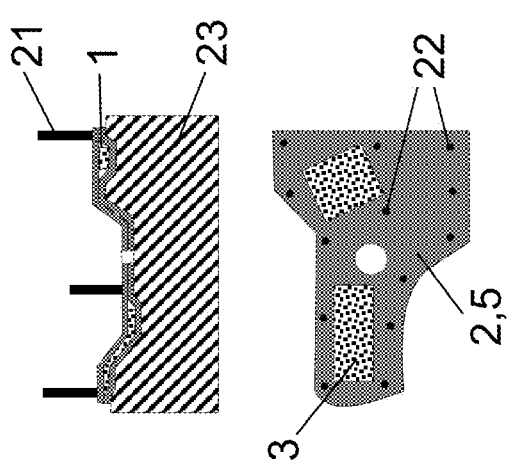

As illustrated in FIG. 24, then, the core and marginal regions of the sandwich 1 are joined by way of spot welding, friction stir welding, riveting, clinching, adhesive bonding, etc. in a mould receptacle, so that the component remains inherently stable for further processing up to final curing. If high temperatures are introduced during joining, for example by welding, the prepreg 3 has to be at a minimum distance of approximately 30 mm from the joining points 22, so as not to be damaged. The sandwich 1 may then be transported in a transport rack 20 and stored.

Figure 26:
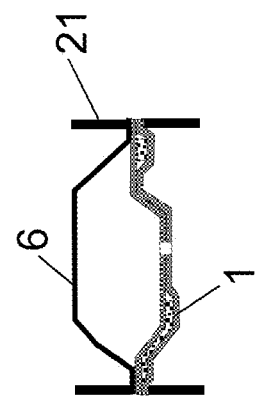

As illustrated in FIG. 26, the sandwich 1 is joined to a vehicle body part 6 to form a subassembly or a vehicle body. The joining may be effected by way of welding, riveting, clinching, screwing, adhesive bonding, etc. Preceding cleaning of the joining surfaces may be necessary, for example in the case of adhesive bonding using structural adhesive.

This is followed by a coating process (not illustrated) for the vehicle body or the vehicle body module and the curing of the sandwich. The vehicle body or the module undergoes a conventional coating process. The coating process may comprise the following process steps, for example in a bodywasher and pretreatment system: degreasing, activation, phosphating, passivation.

This is followed by the actual cathodic dip coating (CDC): the vehicle body passes through one or more dipping basins for CDC coating and cleaning. The prevailing temperatures of up to 60° C. initially are not sufficient to cure the component. After these baths, the CDC coating is burned into the vehicle body by way of drying at 155-185° C. for at least 15 minutes. In this process, the vehicle body passes through a dryer with heat retention and cooling phases.

The available time and temperature window, without heating and cooling times, of at least 15 minutes at 155-185° C. is sufficient for curing the resin at least to an extent of 95%. Up to the end of the coating process, high temperatures are again applied during topcoat application, at least 140° C. for 10 minutes, at which the component is cured further.

Figure 27:
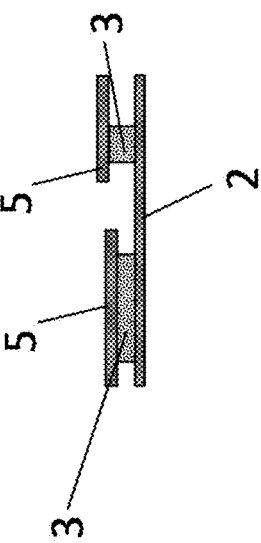
FIG. 27 illustrates a sandwich for use in a method in accordance with embodiments.

As illustrated in FIG. 27, a plurality of separate semifinished product layers 3 may also be arranged on a common first metal sheet layer 2. In this case, in particular, it may be advantageous to cover these separate semifinished product layers 3 with a plurality of separate, relatively small metal sheets rather than with a common second metal sheet layer 5. The covering of the semifinished product layer 3 with metal sheet layers 2, 5 on the top side and bottom side is in any event also advantageous since the semifinished product layer 3 might otherwise stick to a deep drawing tool.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SIGNS

1 Sandwich component
2 First metal sheet layer
3 Semifinished product layer
5 Second metal sheet layer
6 Vehicle body part
7 Fabric layer
8 Coil
9 Receiving and clamping apparatus
10 Protective film
11 Press
12 Bottom press part
13 Die
14 Drawing punch, metal sheet holder
15 Holding-down device
16 Cutting tool top part
17 Cutting tool bottom part
18 Cut
19 Perforation
20 Transport rack
21 Joining tool
22 Joining point
23 Receptacle joining station

What is claimed is:

1. A method for producing a vehicle body, the method comprising:
   producing at least one sandwich component having a first metal sheet layer, a semifinished product layer formed by a non-cured semifinished product pre-impregnated with a matrix, and a second metal sheet layer;

forming the vehicle body by joining the sandwich component into a vehicle body part, the matrix of the semifinished product layer of the sandwich component being uncured; and dip coating and drying the vehicle body, the matrix of the semifinished product layer of the sandwich component being cured during the dip coating and drying of the vehicle body.

2. The method of claim 1, wherein producing the sandwich component comprises pressing the semifinished product layer onto the first metal sheet layer and pressing the second metal sheet layer onto the semifinished product layer.

3. The method of claim 1, wherein the matrix of the semifinished product layer is used as an adhesive for producing the sandwich components.

4. The method of claim 1, wherein, before producing the sandwich component, the metal sheet for the first and the second metal sheet layers is cut to size, cleaned and/or dried.

5. The method of claim 1, wherein, after producing the sandwich component and before joining the sandwich component into the vehicle body part, forming the sandwich component at a temperature of below 70° C.

6. The method of claim 1, wherein producing the sandwich component comprises comprises joining the first and second metal sheet layers of the sandwich component to one another at least in marginal regions of the sandwich component.

7. The method of claim 6, wherein joining the first and second metal sheet layers of the sandwich component to one another is done by spot welding, friction stir welding, riveting, clinching and/or adhesive bonding.

8. The method of claim 1, wherein joining the sandwich component into a vehicle body part is done by welding, riveting, clinching, screwing and/or adhesive bonding.

9. The method of claim 1, wherein dip coating and drying the vehicle body comprises a drying phase at predetermine temperature and a predetermined time period.

10. The method of claim 9, wherein the matrix of the semifinished product layer of the sandwich component is cured in the drying phase.

11. The method of claim 10, wherein the drying phase takes place at temperatures above 100° C. for at least 10 minutes.

12. The method of claim 10, wherein the drying phase takes place at temperatures of 155° C. to 185° C. for at least 15 minutes.

13. The method of claim 10, furthering comprising, after the drying phase, applying a topcoat at temperatures of at least 140° C., such that the matrix of the semifinished product layer of the sandwich component is additionally cured.

14. The method of claim 1, wherein at least one of the metal sheet layers comprises a plurality of separate metal sheets.

15. The method of claim 1, wherein the semifinished product layer of the sandwich component comprises a plurality of separate semifinished products.

16. The method of claim 1, wherein at least one of the metal sheet layers comprises a plurality of separate metal sheets and the semifinished product layer of the sandwich component comprises a plurality of separate semifinished products.

17. A method for producing a vehicle body module, the method comprising:

producing at least one sandwich component having a first metal sheet layer, a semifinished product layer formed by a non-cured semifinished product pre-impregnated with a matrix, and a second metal sheet layer;

joining the sandwich component into a vehicle body part to thereby form the vehicle body in which the matrix of the semifinished product layer of the sandwich component is uncured; and dip coating and drying the vehicle body, the matrix of the semifinished product layer of the sandwich component being cured during the dip coating and drying of the vehicle body.

18. The method of claim 17, wherein the vehicle body module comprises a subassembly of a vehicle.

* * * * *